(12) United States Patent
Iqbal et al.

(10) Patent No.: US 10,522,802 B2
(45) Date of Patent: Dec. 31, 2019

(54) TRACTION BATTERY ENCLOSURE COMPRESSION LIMITER

(71) Applicant: Ford Global Technologies, LLC, Dearborn, MI (US)

(72) Inventors: Asif Iqbal, Macomb, MI (US); Jason Sielaff, Ann Arbor, MI (US); Josef Dollison, Petersburg, MI (US); Jeremy Samborsky, Livonia, MI (US); Daniel Miller, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 516 days.

(21) Appl. No.: 15/438,083

(22) Filed: Feb. 21, 2017

(65) Prior Publication Data

US 2018/0241019 A1 Aug. 23, 2018

(51) Int. Cl.
| | |
|---|---|
| *B60J 10/18* | (2016.01) |
| *H01M 2/10* | (2006.01) |
| *B60L 50/64* | (2019.01) |
| *B60K 6/28* | (2007.10) |
| *F16B 43/00* | (2006.01) |
| *B60K 6/365* | (2007.10) |
| *B60K 6/445* | (2007.10) |

(52) U.S. Cl.
CPC ............. *H01M 2/1077* (2013.01); *B60K 6/28* (2013.01); *B60L 50/64* (2019.02); *F16B 43/00* (2013.01); *B60K 6/365* (2013.01); *B60K 6/445* (2013.01); *B60Y 2200/92* (2013.01); *B60Y 2410/10* (2013.01); *H01M 2220/20* (2013.01); *Y02T 10/7005* (2013.01); *Y10S 903/907* (2013.01); *Y10S 903/911* (2013.01)

(58) Field of Classification Search
CPC ......... F16J 15/127; F16J 15/121; B60J 10/18; H01M 2/1016
USPC ........................................................ 277/639
See application file for complete search history.

(56) References Cited

U.S. PATENT DOCUMENTS

| | | | |
|---|---|---|---|
| 5,173,026 | A | 12/1992 | Cordola et al. |
| 9,281,547 | B2 | 3/2016 | Maguire et al. |
| 9,457,743 | B2 | 10/2016 | Soleski et al. |
| 2012/0155988 | A1* | 6/2012 | Schumacher ........... F16B 31/02 411/369 |

(Continued)

FOREIGN PATENT DOCUMENTS

| | | |
|---|---|---|
| JP | 5168266 | 3/2013 |
| JP | 5212086 | 6/2013 |

OTHER PUBLICATIONS

Hansen, Michael. Overmolding: A Multifaceted Medical Device Technology. Posted Jan. 1, 2006. Retrieved from http://www.mddionline.com/article/overmolding-multifaceted-medicaldevice-technology on Dec. 21, 2016.

*Primary Examiner* — King M Chu
(74) *Attorney, Agent, or Firm* — David Kelley; Carlson, Gaskey & Olds, P.C.

(57) ABSTRACT

An exemplary traction battery assembly includes, among other things, a first portion of an enclosure, a second portion of the enclosure, and a compression limiter. The first portion is overmolded to the compression limiter. An exemplary method includes, among other things, securing a first portion of an enclosure for a traction battery to a second portion, and limiting compression of the first portion during the securing using a compression limiter. The first portion is overmolded to the compression limiter.

18 Claims, 5 Drawing Sheets

(56) References Cited

U.S. PATENT DOCUMENTS

2014/0079981 A1\* 3/2014 Sheen ............... H01M 2/202
429/156
2014/0154539 A1\* 6/2014 Kwok ............ H01M 10/643
429/82

\* cited by examiner

TRACTION BATTERY ENCLOSURE COMPRESSION LIMITER

TECHNICAL FIELD

This disclosure relates generally to an enclosure for a traction battery and, more particularly, to a compression limiter incorporated into the enclosure.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

The traction battery is a relatively high-voltage battery that selectively powers the electric machines and other electrical loads of the electrified vehicle. The traction battery includes a plurality of interconnected battery cells that store energy. The traction battery can include an enclosure housing the battery cells.

SUMMARY

A traction battery assembly according to an exemplary aspect of the present disclosure includes, among other things, a first portion of an enclosure, a second portion of the enclosure, and a compression limiter. The first portion is overmolded to the compression limiter.

In a further non-limiting embodiment of the foregoing assembly, the first portion comprises a polymer-based material.

In a further non-limiting embodiment of any of the foregoing assemblies, the polymer-based material is reinforced with a glass-fill.

In a further non-limiting embodiment of any of the foregoing assemblies, the second portion is a metal or metal alloy.

In a further non-limiting embodiment of any of the foregoing assemblies, the second portion is a polymer-based material.

In a further non-limiting embodiment of any of the foregoing assemblies, the first portion is a lid and the second portion is a tray.

In a further non-limiting embodiment of any of the foregoing assemblies, the first portion is a tray and the second portion is a lid.

A further non-limiting embodiment of any of the foregoing assemblies includes a mechanical fastener that extends through an aperture in the compression limiter and secures the first portion to the second portion.

In a further non-limiting embodiment of any of the foregoing assemblies, the mechanical fastener does not contact the first portion when securing the first portion to the second portion.

In a further non-limiting embodiment of any of the foregoing assemblies, the compression limiter is a metal or metal alloy.

In a further non-limiting embodiment of any of the foregoing assemblies, the compression limiter is an aluminum alloy.

In a further non-limiting embodiment of any of the foregoing assemblies, the compression limiter is annular, and a radially outer surface of the compression limiter is formed with a groove that receives a tongue of the first portion such that portions of the compression limiter radially overlap with the tongue.

In a further non-limiting embodiment of any of the foregoing assemblies, the first portion includes a housing section that defines at least part of an open area to receive a battery array, a peripheral flange about a perimeter of the housing section, and a plurality of stiffening ribs extending from the housing section to the peripheral flange. The compression limiter is within the peripheral flange.

A method according to another exemplary aspect of the present disclosure includes, among other things, securing a first portion of an enclosure for a traction battery to a second portion, and limiting compression of the first portion during the securing using a compression limiter. The first portion is overmolded to the compression limiter.

In a further non-limiting embodiment of the foregoing method, the compression limiter is a metal or metal alloy, and the first portion is polymer-based.

In further non-limiting embodiment of any of the foregoing methods, the second portion is a metal or metal alloy.

A further non-limiting embodiment of any of the foregoing methods includes securing the first portion to the second portion with a mechanical fastener that extends through an aperture in the compression limiter.

A further non-limiting embodiment of any of the foregoing methods includes threadably engaging the second portion with the mechanical fastener.

A further non-limiting embodiment of any of the foregoing methods includes securing without the mechanical fastener contacting the first portion.

In a further non-limiting embodiment of any of the foregoing methods, the compression limiter is annular, and the first portion is overmolded to the compression limiter with a tongue of the first portion that extends into a groove of the compression limiter such that portions of the compression limiter radially overlap with the tongue.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to clamping together first and second portions of a traction battery enclosure. At least one of the first or the second portions incorporates a compression limiter that facilitates keeping the first and second portions tightly clamped. If the clamp load were reduced due to, for example, plastic creep, the first and second portions could shift relative to each other. The shifting could result in passageways to an interior of the traction battery enclosure, which could, among other things, permit contaminants to enter the interior.

Figure 1:
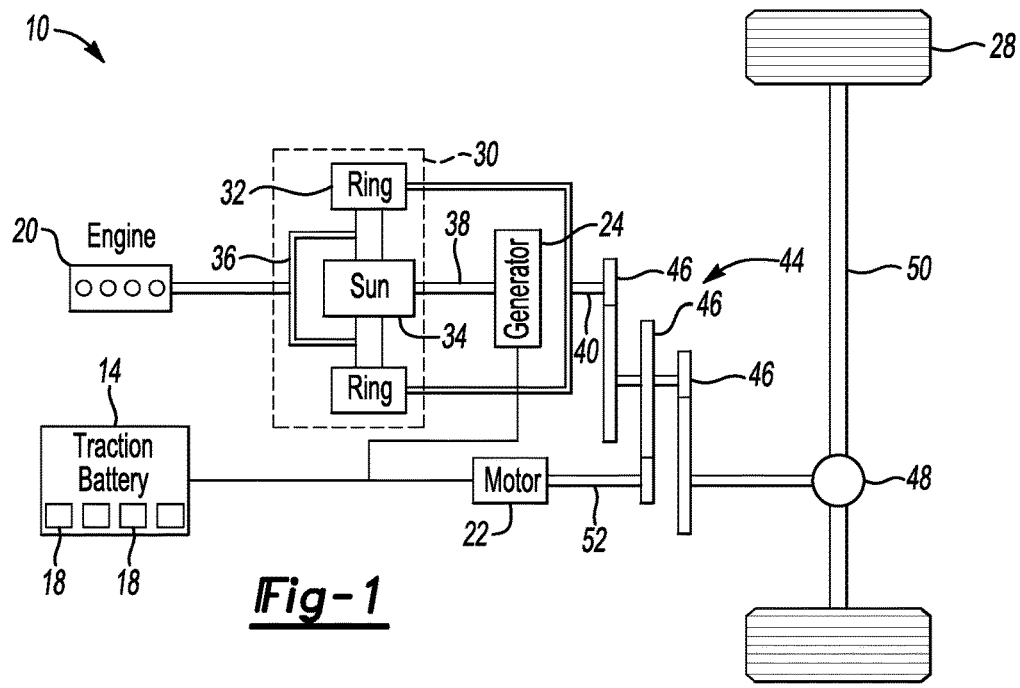
FIG. 1 illustrates a schematic view of an example powertrain for an electrified vehicle.

FIG. 1 schematically illustrates a powertrain 10 for an electrified vehicle. Although depicted as a hybrid electric vehicle (HEV), it should be understood that the concepts described herein are not limited to HEVs and could extend to any other type of electrified vehicle, including, but not limited to, plug-in hybrid electric vehicles (PHEVs), battery electric vehicles (BEVs), fuel cell vehicles, etc.

The powertrain 10 includes a traction battery 14 having a plurality of battery arrays 18, an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the traction battery 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 52 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the traction battery 14.

Figure 2:
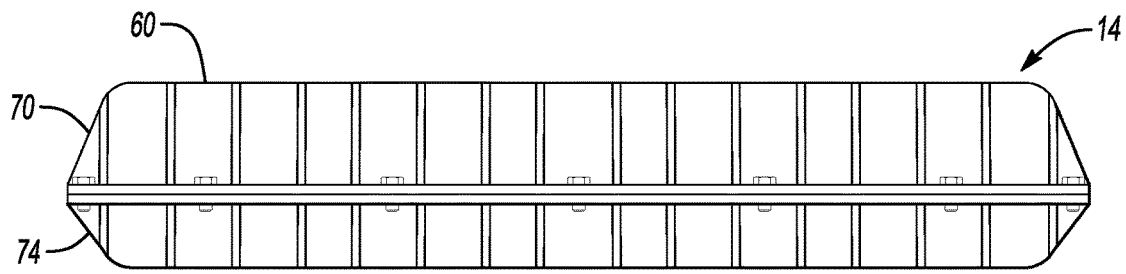
FIG. 2 illustrates a side view of a traction battery from the powertrain of FIG. 1.
Figure 3:
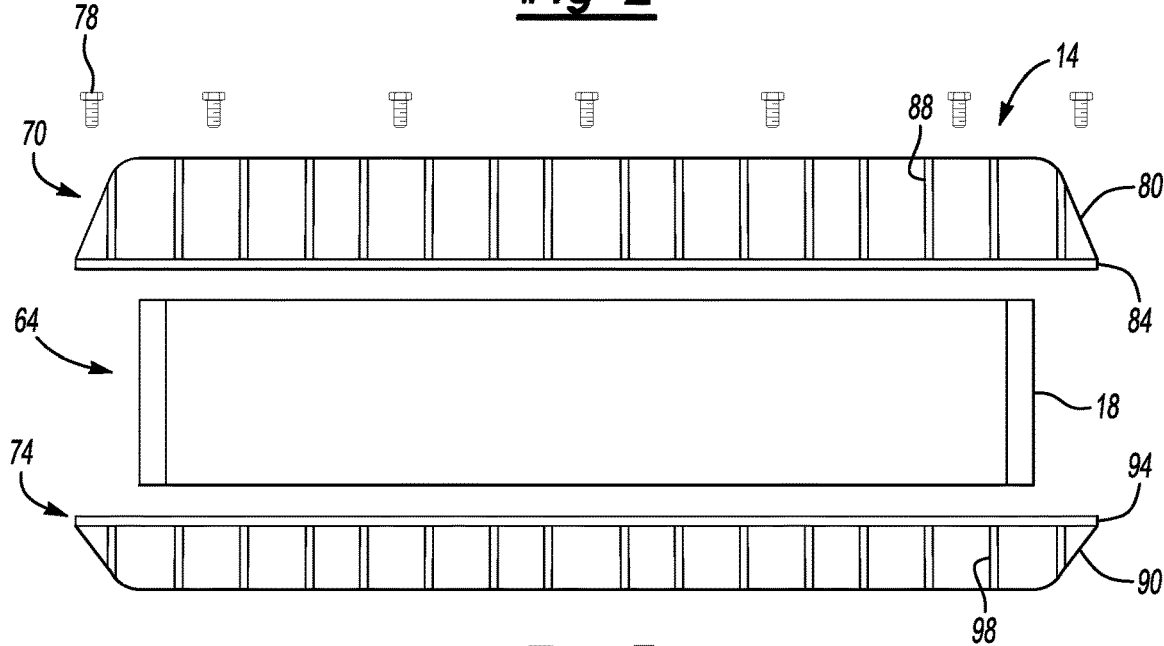
FIG. 3 illustrates an expanded, side view of the traction battery of FIG. 2.

Referring now to FIGS. 2 and 3, the traction battery 14 includes an enclosure 60 providing an open area 64 housing the battery arrays 18. The enclosure 60 could house one or a plurality of the battery arrays 18. The traction battery 14, with the enclosure 60, can be mounted to a vehicle outside a passenger cabin. The enclosure, among other things, protects the battery arrays 18 from environmental contaminants and corrosion.

The enclosure 60 includes at least a first portion and a second portion. In an exemplary non-limiting embodiment, the first portion is a lid 70 of the enclosure 60 and the second portion is a tray 74 of the enclosure 60. In another embodiment, the first portion is the tray 74 of the enclosure 60 and the second portion is the lid 70 of the enclosure 60.

The first portion and second portion are not limiting to being a tray or a lid. If the enclosure 60 included a separate sidewall, for example, the first portion or second portion could be the separate sidewall.

Referring again to the enclosure 60, the lid 70 is secured to the tray 74 to provide the open area 64 therebetween. A plurality of mechanical fasteners 78 are used to secure the lid 70 to the tray 74. The interface between the lid 70 and the tray 74 can be sealed with a polymer seal, for example.

Figure 4:
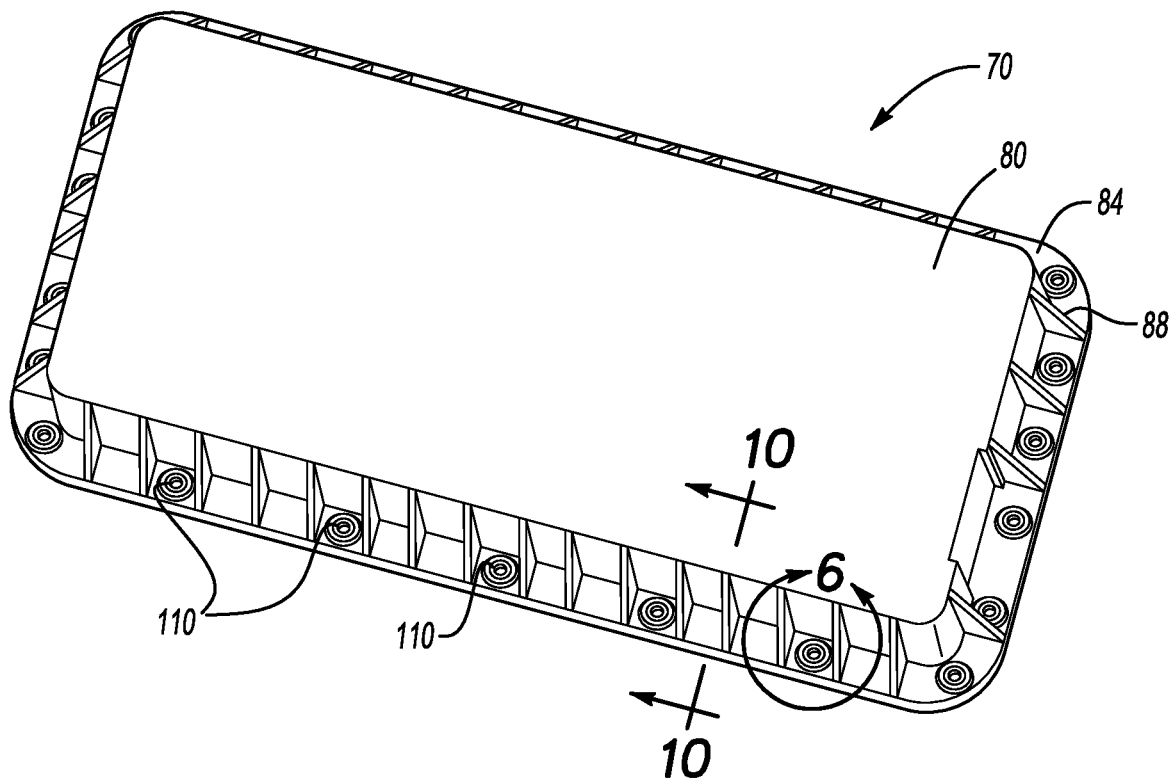
FIG. 4 illustrates a perspective view of a lid from an enclosure of the traction battery of FIG. 2.
Figure 5:
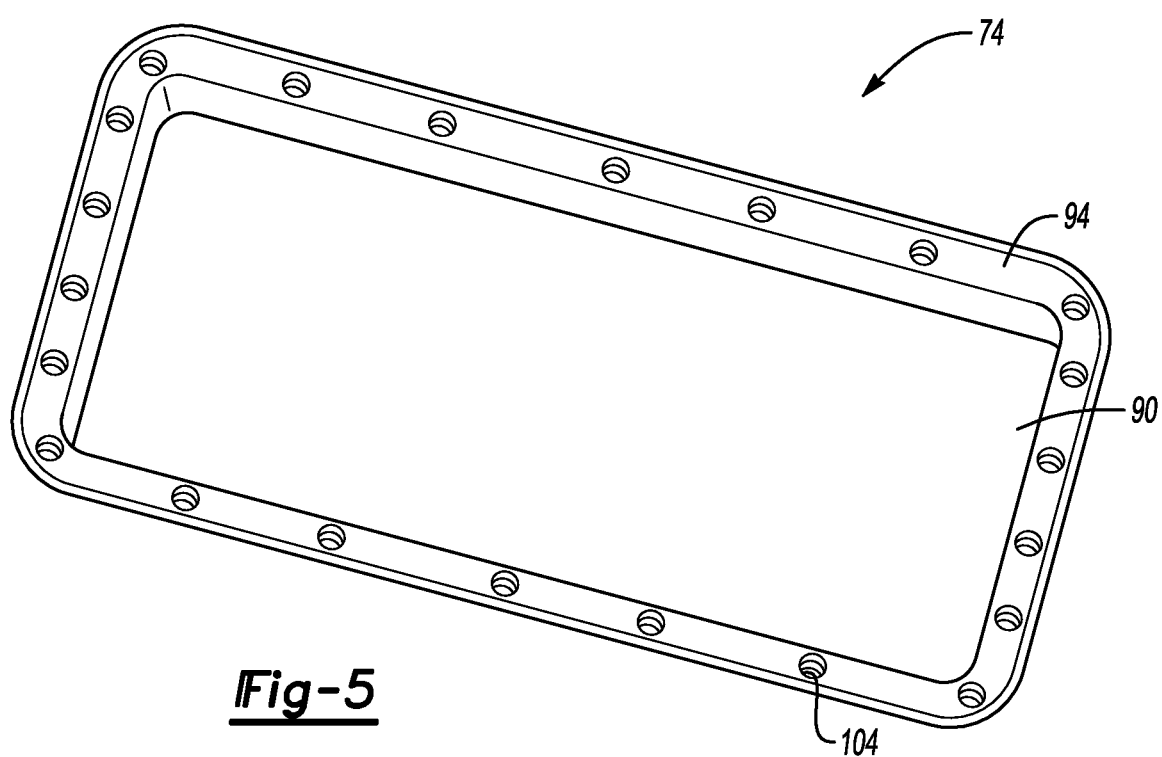
FIG. 5 illustrates a perspective view of a tray from an enclosure of the traction battery of FIG. 2.
Figure 6:
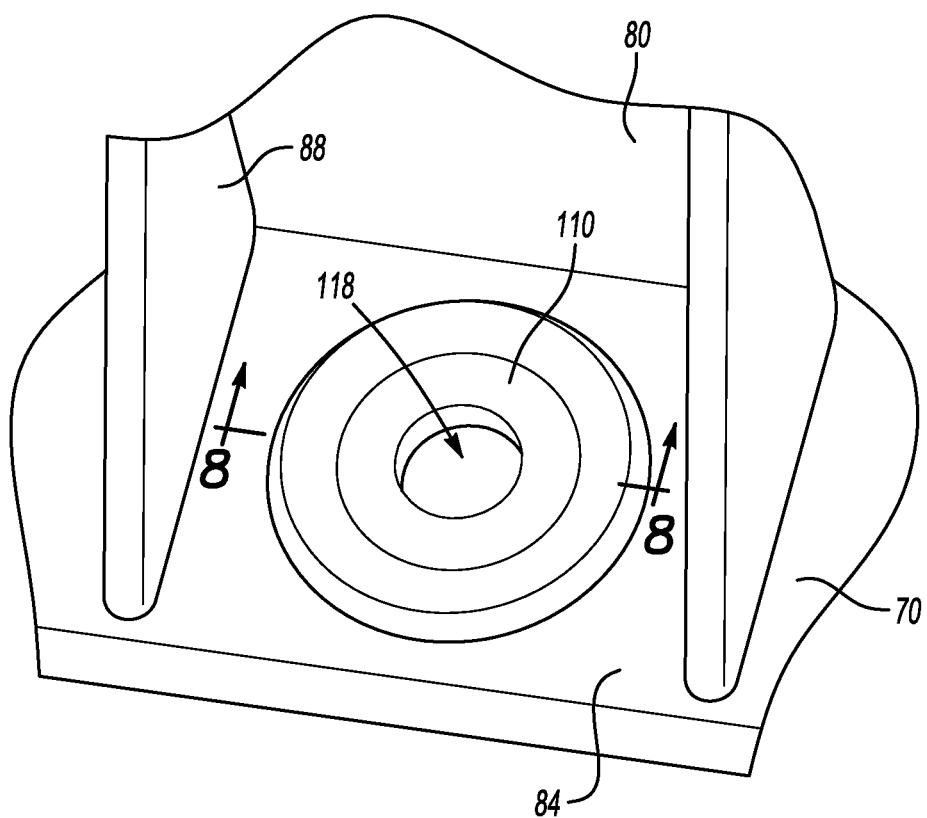
FIG. 6 illustrates a close-up view of Area 6 in FIG. 4.
Figure 7:
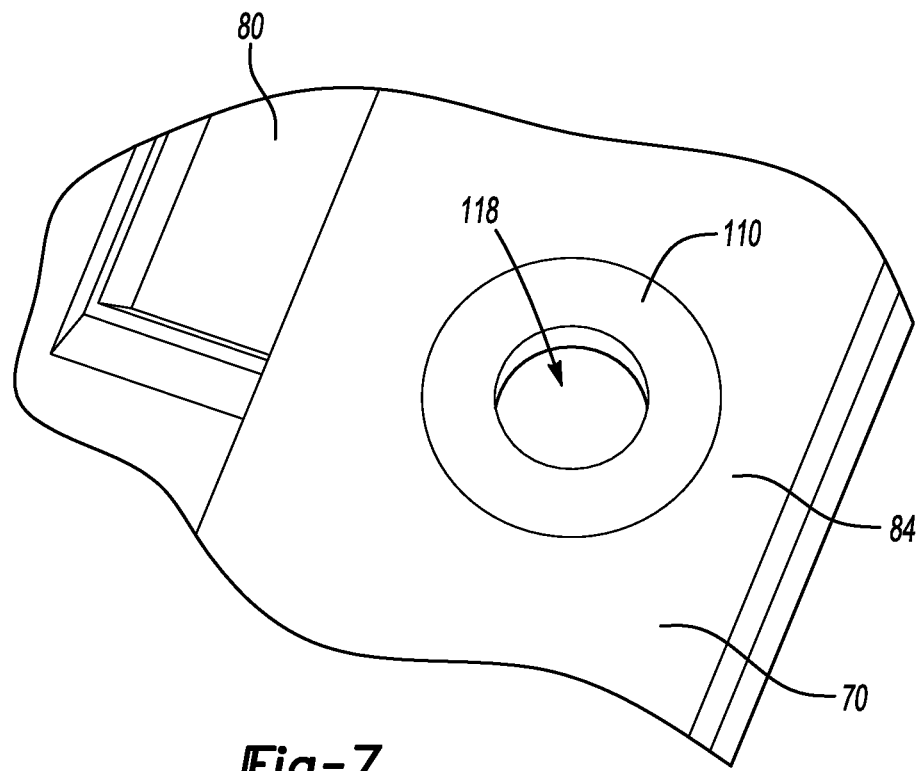
FIG. 7 illustrates a bottom view of Area 6 from FIG. 6.

Referring now to FIGS. 4 and 5 with continuing reference to FIGS. 2 and 3, the lid 70 includes a housing section 80, a peripheral flange 84, and a plurality of stiffening ribs 88. The housing section 80 provides at least part of the open area 64 that receives the battery array 18. The peripheral flange 84 extends about a perimeter of the housing section 80.

The lid 70 is made of a polymer-based material, such as a thermoplastic or thermoset material. In some specific examples, the polymer-based material of the lid 70 is an oil pan grade plastic resin like PA66.

The material of the lid 70 could further comprise a reinforcing additive, such as glass-fill or carbon fiber-fill. The material of the lid 70 could instead, or additionally, comprise a conductive filler material if needed for electromagnetic compatibility of the lid 70. The lid 70 can be formed with channels to facilitate heat rejection from the traction battery 14. In some exemplary embodiments, the lid 70 could include such channels formed in an outer facing surface of the lid 70 to provide fins or heat sinks to facilitate heat rejections. Air driven by a fan, ram air, or another type of flow could be moved through the channels across the fins to remove thermal energy from the lid 70.

The lid 70, being polymer-based, is lighter than a similarly sized lid that is a metal or metal alloy. Making the lid 70, or another portion of the enclosure 60, of a polymer-based material can thus reduce weight verses an enclosure that is made of a metal or metal alloy. The polymer-based material can also save costs over materials that would require e-coating.

The tray 74 includes a housing section 90, a peripheral flange 94, and a plurality of stiffening ribs 98 extending from the housing section 90 to the peripheral flange 94. The housing section 90 provides a remaining part of the open area 64 that receives the battery array 18. The peripheral flange 94 extends about a perimeter of the housing section 90.

The example tray 74 is made of a metal or metal alloy. In one specific exemplary embodiment, the tray 74 is made of aluminum. In another exemplary embodiment, the tray 74 is made of a polymer-based material that is harder than the polymer-based material of the lid 70.

In the exemplary non-limiting embodiment, the plurality of mechanical fasteners 78 are threaded fasteners, such as M6 bolts, that engage respective threaded bores 104 in the tray 74. The plurality of mechanical fasteners 78, when torqued down into the installed position of FIG. 2, clamp the peripheral flange 84 of the lid 70 against the peripheral flange 94 of the tray 74.

Since the lid 70 is made of a polymer-based material, which is relatively soft, applying a clamp load to the material of the flange 84 could compress the material of the flange 84 and cause the polymer-based material to creep over time. The creep may cause the mechanical fastener 78 to become loose. The loose mechanical fastener 78 could permit movement of the lid 70 relative to the tray 74, which could then, among other things, provide a passageway through the interface. Contaminants could undesirably move through the passageway to the open area 64.

To address the mechanical fastener 78 potentially loosening due to compression of the flange 84, the exemplary flange 84 is overmolded to a plurality of compression limiters 110 distributed about perimeter of the lid 70 and held within the flange 84. In this example, one of the compression limiters 110 is used in connection with each of the mechanical fasteners 78 securing the lid 70 to the tray 74. The compression limiters 110, in this non-limiting embodiment, are a metal or metal based material. The compression limiters 110 could be a galvanized K-alloy, for example.

When one of the mechanical fastener 78 is torqued into one of the threaded bores 104, the compression limiter 110 is clamped between a head 114 of the mechanical fastener 78 and the flange 94 of the tray 74. The compression limiter 110 is thus loaded rather than the flange 84 of the lid 70.

The compression limiter 110 is made of a material that substantially uncompressible relative to the flange 84. Thus, the mechanical fastener 78 can remain tightly engaged within the threaded bore 104 of the tray and prevent movement of the lid 70 relative to the tray 74. In some examples, the compression limiter 110 is made of a metal or metal alloy, which can also provide a portion of a ground path for the traction battery 14 within the open area 64 to an area outside of the enclosure 60.

Referring now to FIGS. 6-9, the compression limiter 110 is an annulus and provides an aperture 118 that receives a shaft 122 of the mechanical fastener 78. The aperture 118 includes no threads in this example.

Figure 8:
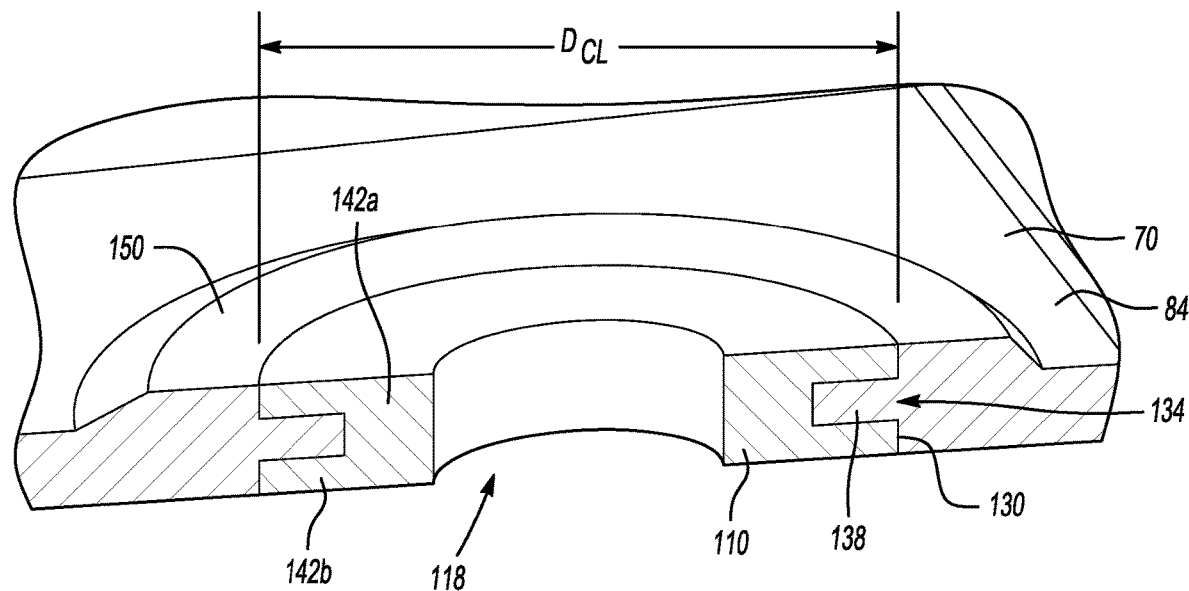
FIG. 8 illustrates a section view of a flange of the lid in FIG. 4 taken at Line 8-8 in FIG. 6.
Figure 9:
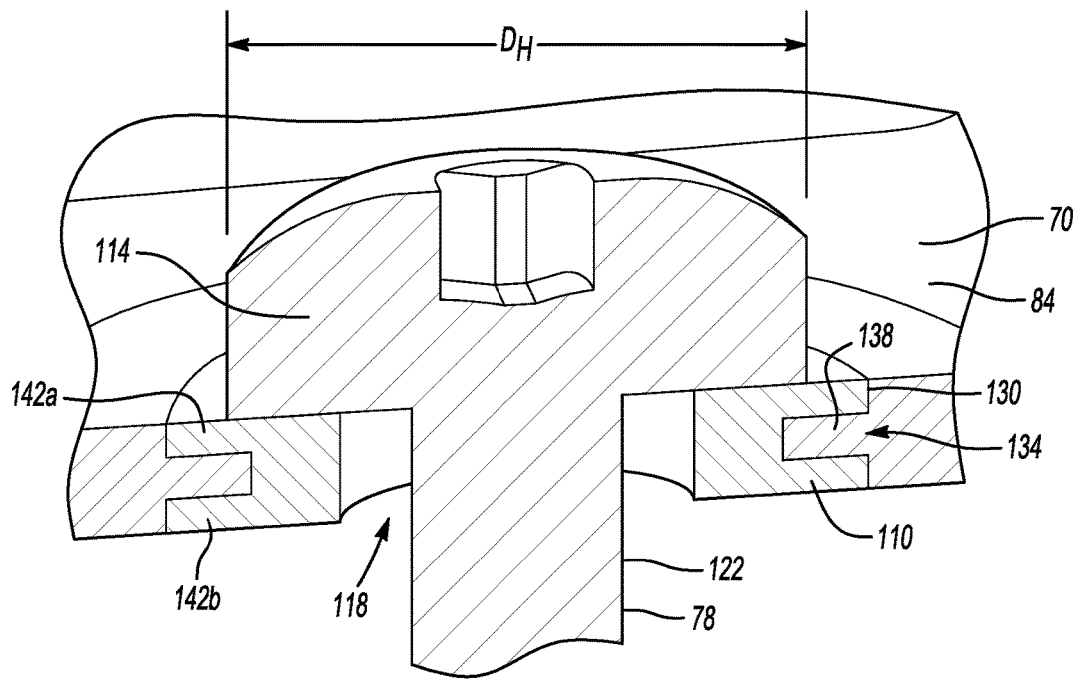
FIG. 9 illustrates a section view at Line 8-8 in FIG. 6 when a mechanical fastener is in an installed position.

In this exemplary embodiment, the head 114 of the mechanical fastener 78 has a diameter $D_H$ (FIG. 9), and a side of the compression limiter 110 interfacing with the head 114 has a diameter $D_{CL}$ (FIG. 8). The compression limiter 110 is sized such that the diameter $D_{CL}$ is larger than the diameter $D_H$. Sizing the diameter $D_{CL}$ of the compression limiter 110 in this way ensures that the head 114 clamps against the compression limiter 110 without clamping directly against the flange 84. That is, the head 114 and the remaining portions of the mechanical fastener 78 touch no part of the flange 84 when clamping the flange 84 against the flange 94 of the tray 74. Oversizing the compression limiter 110 relative to the head 114 in this way can facilitate a proper bearing surface for maintaining a residual torque that results in a clamp load sufficient for sealing the flange 84.

In other examples, the diameter $D_H$ of the head 114 can be larger than the diameter $D_{CL}$ of the compression limiter 110.

To secure the compression limiter 110 within the flange 94, the flange 94 is overmolded to the compression limiter 110. The compression limiter 110 could be, for example, placed within a mold cavity corresponding to the desired dimensions of the lid 70. Molten polymer material is injected into the mold cavity. The polymer material then cures, which holds the position of the compression limiter 110 within the flange 94.

In this example, a radially outer surface 130 of the compression limiter 110 is formed with a groove 134 that receives a tongue 138 of the flange 84. Axial end portions 142a and 142b of the compression limiter 110 thus radially overlap with the tongue 138. The overlapping of the axial end portions 142a and 142b with the tongue 138 can prevent the compression limiter 110 from withdrawing axially from the flange 84. Notably, the above described oversizing of the compression limiter 110 relative to the head 114 provides radial space within the compression limiter 110 to accommodate the tongue 138 while still keeping the tongue 138 spaced radially from the mechanical fastener 78. This can ensure that the tongue 138 does not result in a relatively soft joint. That is, the compression limiter 110 can accommodate the tongue 138 radially while still keeping a radial amount of compression limiter 110 uninterrupted by the tongue 138. The radial amount uninterrupted by the tongue 138 can be clamped firmly between the head 114 and the flange 94 of the tray 74 to provide a relatively hard joint.

In this example, an area of the flange 84 surrounding the compression limiter 110 is raised relative to other areas of the flange 84. This provides an area localized about the compression limiter 110 that is thicker than the other areas of the flange 84, which can strengthen the flange 84 in the area of the compression limiter 110.

The exemplary compression limiter 110 is shown as being held within the flange 84 of the lid 70. In another example, the compression limiter 110 could be held within the flange 94 of the tray 74. In such an example, the flange 84 in FIG. 6 would be a flange of the tray 74 rather than the flange 84 of the lid 70.

Positioning the compression limiter 110 within the tray 74 could be advantageous if the tray 74 were, for example, made of a polymer-based material, or some other material that is soft relative to a material of the lid 70. For example, the tray 74 could include the compression limiter 110 if the tray 74 were polymer-based and the lid were a metal or metal alloy.

Figure 10:
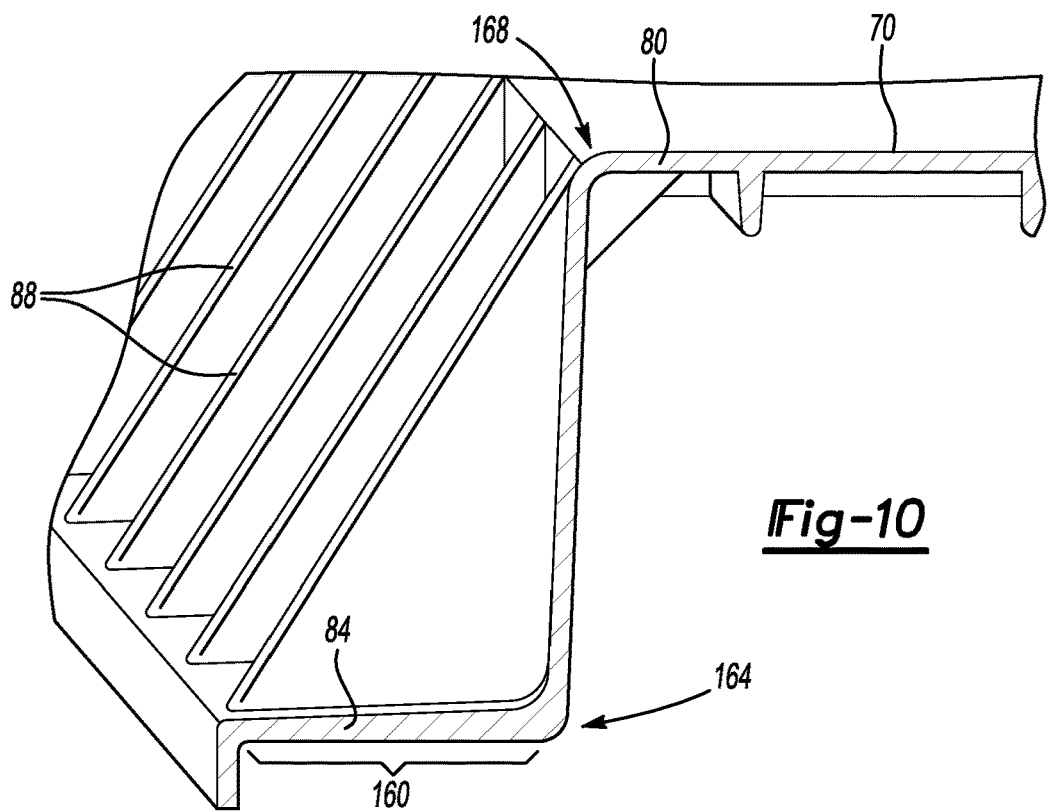
FIG. 10 illustrates a section, perspective view of the lid in FIG. 4 at line 10-10 in FIG. 4.

Referring now to FIG. 10 with reference to FIGS. 2 and 3, the plurality of stiffening ribs 88 extend from the housing section 80 to the peripheral flange 84. The stiffening ribs 88 can mitigate a bending moment that induces movement of the peripheral flange 84 relative to the housing section 80. An underside 160 of the flange 84 of the lid 70 seals against the flange 94 of the tray 74 when the mechanical fasteners 78 are torqued down into the installed position of FIG. 2. The stiffening ribs 88 can facilitate the underside 160 having a consistently sealed interface with the flange 94. The stiffening ribs 98 of the tray 74 provide similar support to the flange 94.

The structural support provided by the stiffening ribs 98 can additionally permit sharper bend radii in corners 164 and 168 of the lid 70 than if stiffening ribs 98 were not used. The sharper bend radii can reduce an overall packaging footprint of the enclosure 60. The stiffening ribs 98 of the tray 74 can facilitate usage of sharper bend radii in the tray 74.

Figure 11:
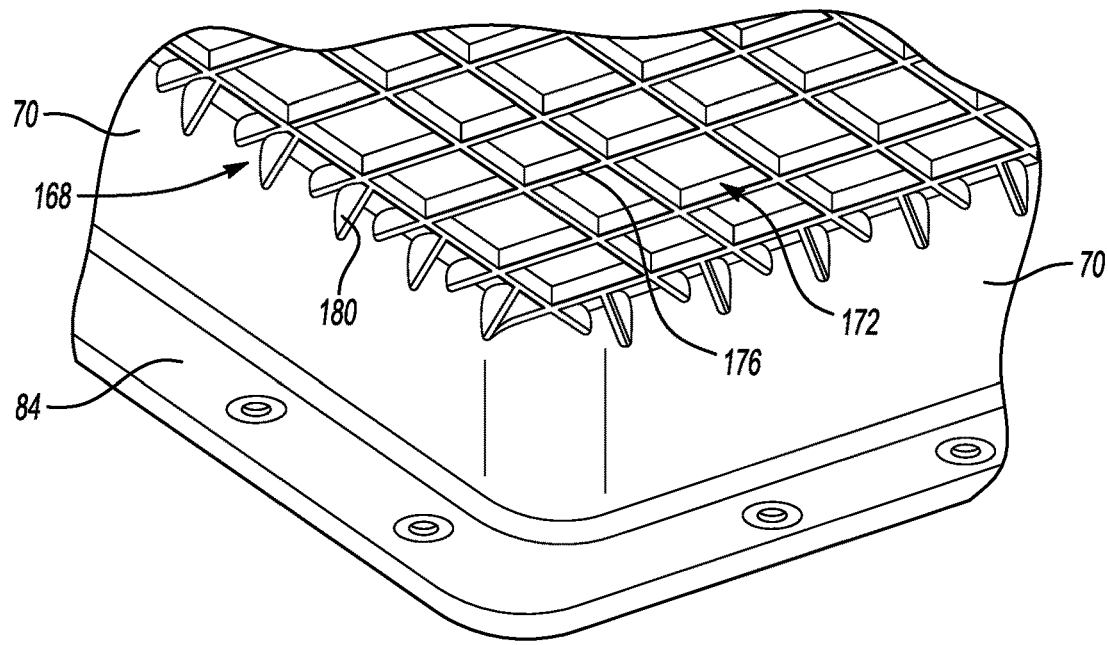
FIG. 11 illustrates an underside of the lid of FIG. 4 that faces an open area provided by the enclosure of FIGS. 2 and 3.

Referring now to FIG. 11 with reference to FIGS. 2 and 3, a mesh 172 of ribs 176 can be incorporated into the lid 70 for added structural support. The ribs 176 extend into the open area 64 of the enclosure 60 in this example. Other ribs 180 can be positioned at the corner 168 to add additional structural support to the corner 168.

Features of some of the disclosed examples include securely joining a relatively soft portion of a traction battery enclosure to a relatively hard portion, and preventing the joining from compressing the relatively soft portion by overmolding a compression limiter into the relatively soft portion.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A traction battery assembly, comprising:
    a first portion of an enclosure;
    a second portion of the enclosure; and
    a compression limiter, the first portion overmolded to the compression limiter, wherein the compression limiter is annular, and a radially outer surface of the compression limiter is formed with a groove that receives a tongue of the first portion such that portions of the compression limiter radially overlap with the tongue.

2. The assembly of claim 1, wherein the first portion comprises a polymer-based material.

3. The assembly of claim 2, wherein the polymer-based material is reinforced with a glass-fill.

4. The assembly of claim 2, wherein the second portion is a metal or metal alloy.

5. The assembly of claim 2, wherein the second portion is a polymer-based material.

6. The assembly of claim 1, wherein the first portion is a lid and the second portion is a tray.

7. The assembly of claim 1, wherein the first portion is a tray and the second portion is a lid.

8. A traction battery assembly, comprising:
    a first portion of an enclosure;
    a second portion of the enclosure; and
    a compression limiter, the first portion overmolded to the compression limiter, wherein the first portion includes a housing section that defines at least part of an open area to receive a battery array, a peripheral flange about a perimeter of the housing section, and a plurality of stiffening ribs extending from the housing section to the peripheral flange, wherein the compression limiter is within the peripheral flange.

9. The assembly of claim 8, further comprising a mechanical fastener that extends through an aperture in the compression limiter and secures the first portion to the second portion.

10. The assembly of claim 9, wherein the mechanical fastener does not contact the first portion when securing the first portion to the second portion.

11. The assembly of claim 8, wherein the compression limiter is a metal or metal alloy.

12. The assembly of claim 11, wherein the compression limiter is an aluminum alloy.

13. A method, comprising:
    securing a first portion of an enclosure for a traction battery to a second portion, and limiting compression of the first portion during the securing using a compression limiter, the first portion overmolded to the compression limiter, wherein the compression limiter is annular, and the first portion is overmolded to the compression limiter with a tongue of the first portion that extends into a groove of the compression limiter such that portions of the compression limiter radially overlap with the tongue.

14. The method of claim 13, wherein the compression limiter is a metal or metal alloy, and the first portion is polymer based.

15. The method of claim 14, wherein the second portion is a metal or metal alloy.

16. The method of claim 13, further comprising securing the first portion to the second portion with a mechanical fastener that extends through an aperture in the compression limiter.

17. The method of claim 16, further comprising threadably engaging the second portion with the mechanical fastener.

18. The method of claim 16, further comprising securing without the mechanical fastener contacting the first portion.

* * * * *